US006201627B1

(12) United States Patent
Ohno et al.

(10) Patent No.: US 6,201,627 B1
(45) Date of Patent: Mar. 13, 2001

(54) OPTICAL SCANNING DEVICE

(75) Inventors: Mitsuhiro Ohno; Tetsuya Ori, both of Saitama (JP)

(73) Assignee: Fuji Photo Optical Co., Ltd, Saitama (JP)

( * ) Notice: Subject to any disclaimer, the term of this patent is extended or adjusted under 35 U.S.C. 154(b) by 0 days.

(21) Appl. No.: 09/541,031

(22) Filed: Mar. 31, 2000

(30) Foreign Application Priority Data

Mar. 31, 1999 (JP) .................................................. 11-091535

(51) Int. Cl.[7] .................................................. G02B 26/08
(52) U.S. Cl. .......................... 359/206; 359/205; 359/216
(58) Field of Search .................................... 359/205–207, 359/212, 216–219, 662; 347/256–261

(56) References Cited

U.S. PATENT DOCUMENTS 5,673,136 * 9/1997 Inoue et al. ........................... 359/205
6,104,523 * 8/2000 Ang ...................................... 359/216

* cited by examiner

Primary Examiner—James Phan
(74) Attorney, Agent, or Firm—Young & Thompson

(57) ABSTRACT

An optical scanning device has a rotary polygon mirror and an f-θ lens system which comprises a first lens disposed adjacent to the polygon mirror, a reflection mirror for turning an optical path of the f-θ lens system at an approximately right angle and a second lens disposed in the optical path after the reflection mirror.

10 Claims, 3 Drawing Sheets

OPTICAL SCANNING DEVICE

BACKGROUND OF THE INVENTION

1. Field of the Invention

The present invention relates to improvements in an optical scanning device for scanning a subject medium.

2. Description of the Related Art

In recent years, with development of digital techniques and light sources, numerous high performance printing equipment and the like have been developed, wherein a light beam modulated according to image signals scans a subject matter, such as photographic pictures and printed matter (which is hereafter referred to as a scanning subject medium), that is sensitive to light to record an image on a paper. In such a printing equipment, the utilization is made of an optical scanning device to scan a scanning subject medium. This optical scanning device is, for typical example, configured such that a laser beam from a laser diode is repeatedly reflected and deflected by a rotary polygon mirror and further directed as a scanning beam to a subject medium through an f-θ lens. Because deflection of the scanning beam by the polygon mirror causes defectiveness in the evenness of velocity of straight line motion of the scanning beam along a canning line on the scanning subject medium relative to a temporal change in rotational angle θ of the polygon mirror, the f-θ lens is employed. In order for the optical scanning device to avoid the defectiveness in the evenness of velocity of straight line motion of the scanning beam along a scanning line and keep the velocity of straight line motion of the scanning beam. As is known from, for example, Japanese Patent Publication No. 6-95176, the f-θ lenses that is installed in this type of optical scanning device comprises a plurality of lens elements.

In light of the tendency toward small and light equipment and instruments, for business use or for personal use, there is a strong demand for small and light printers and, in the nature of course, small and light optical scanning devices. It is been a matter of concern how to realize small and light printers and optical scanning devices.

SUMMARY OF THE INVENTION

It is an object of the present invention to provide a compact optical scanning device.

The foregoing object of the present invention is accomplished by providing an optical scanning device for scanning a subject medium with a light beam spot that moves along a straight line on the subject medium, which comprised a scanning optical system installed in an generally rectangular box-shaped housing and includes at least a rotary polygon mirror and an f-θ lens system for continuously varying movement of the scanning beam spot relative to a regular angle of rotation of an polygon mirror so as to scan over the subject medium at an even scanning speed. The f-θ lens system comprises at least first and second lens elements and a reflection mirror located between the first and second lens elements which are arranged so as to turn an optical path of the an f-θ lens system at an approximately right angle between the first and second lens elements and extend along at least two adjacent walls, for example a top wall and one of vertical side walls, of the generally rectangular box-shaped housing. The f-θ lens system may further comprise a second reflection mirror disposed below the second lens element so as to reflect back the scanning beam toward a scanning subject medium.

The rotary polygon mirror is located near the top wall of the generally rectangular box-shaped housing so as to have a vertical axis of rotation and is housed in a dust proof chamber which ha an open top and an opening formed in one of side walls which a scanning beam passes through. This dust proof chamber is closed by closing the open top with a top cover of the generally rectangular box-shaped housing and fitting the first lens element directly into the opening of the side all. The reflection mirror is preferably located at a top corner between the top wall and the vertical side wall so that the optical path of the f-θ lens system extends along the top wall and the side wall.

According to the optical scanning device thus structured, separate arrangement of the lens elements of the f-θ lens system and the folded optical path of the f-θ lens system guarantees an increased freedom of laying out a plurality of optical elements of the f-θ lens system and the overall compactness of the optical scanning device. Moreover, although the f-θ lens system has a relatively long optical path length, the folded optical path realizes a compact layout of optical elements of the f-θ lens system and its associated optical systems.

The optical scanning system may be equipped with a scanning timing control optical system which is disposed behind the second reflection mirror of the f-θ lens system for detecting either a start or an end of every line scanning of the scanning beam spot so as to provide a signal for synchronized scanning. The scanning timing control optical system comprises a reflection mirror located behind the second reflection mirror so as to reflect a scanning beam reflected by the second reflection mirror back to the second reflection mirror at every moment that the polygon mirror turns and changes its active reflection surface on which the laser beam impinges from one to another, and a light sensor located in position to receive the scanning beam reflected by the reflection mirror of the scanning timing control optical system and subsequently by the second reflection mirror to provide a synchronous signal.

According to the optical scanning device equipped with the scanning timing control optical system thus structured, the utilization is made of twice reflection of the scanning beam by the second reflection mirror of the f-θ lens system before receiving the scanning beam by the light sensor, which provides a folded optical path of the scanning timing control optical system and is contributory to the overall compactness of the optical scanning device.

BRIEF DESCRIPTION OF THE DRAWINGS

The above and other objects and features of the present invention will be more apparent from the following detailed description in connection with a preferred embodiment thereof when reading in conjunction with the accompanying drawings, in which.

DETAILED DESCRIPTION OF THE INVENTION

Figure 1:
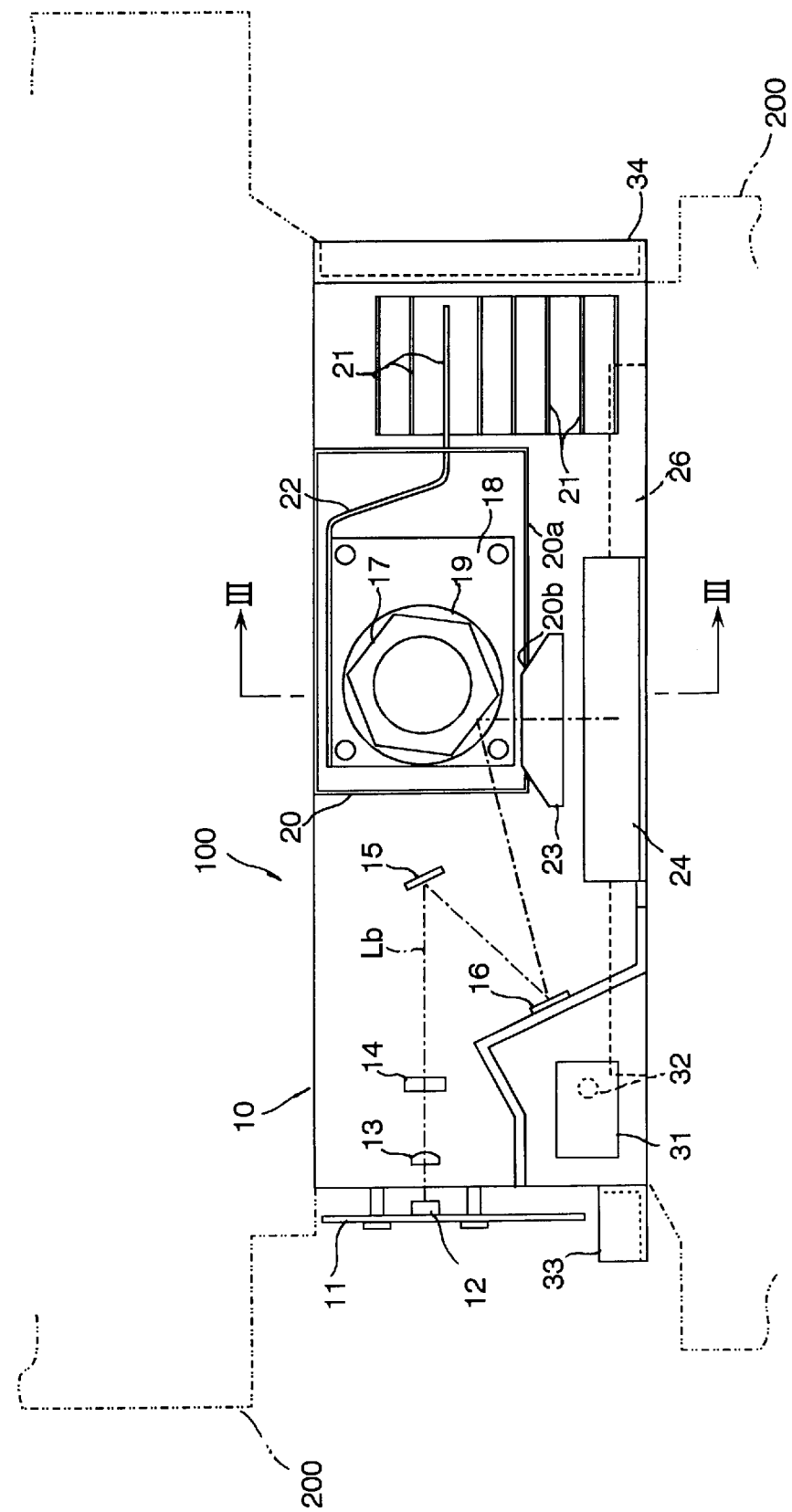
FIG. 1 is a top view of an optical scanning device with a top cover removed away.
Figure 2:
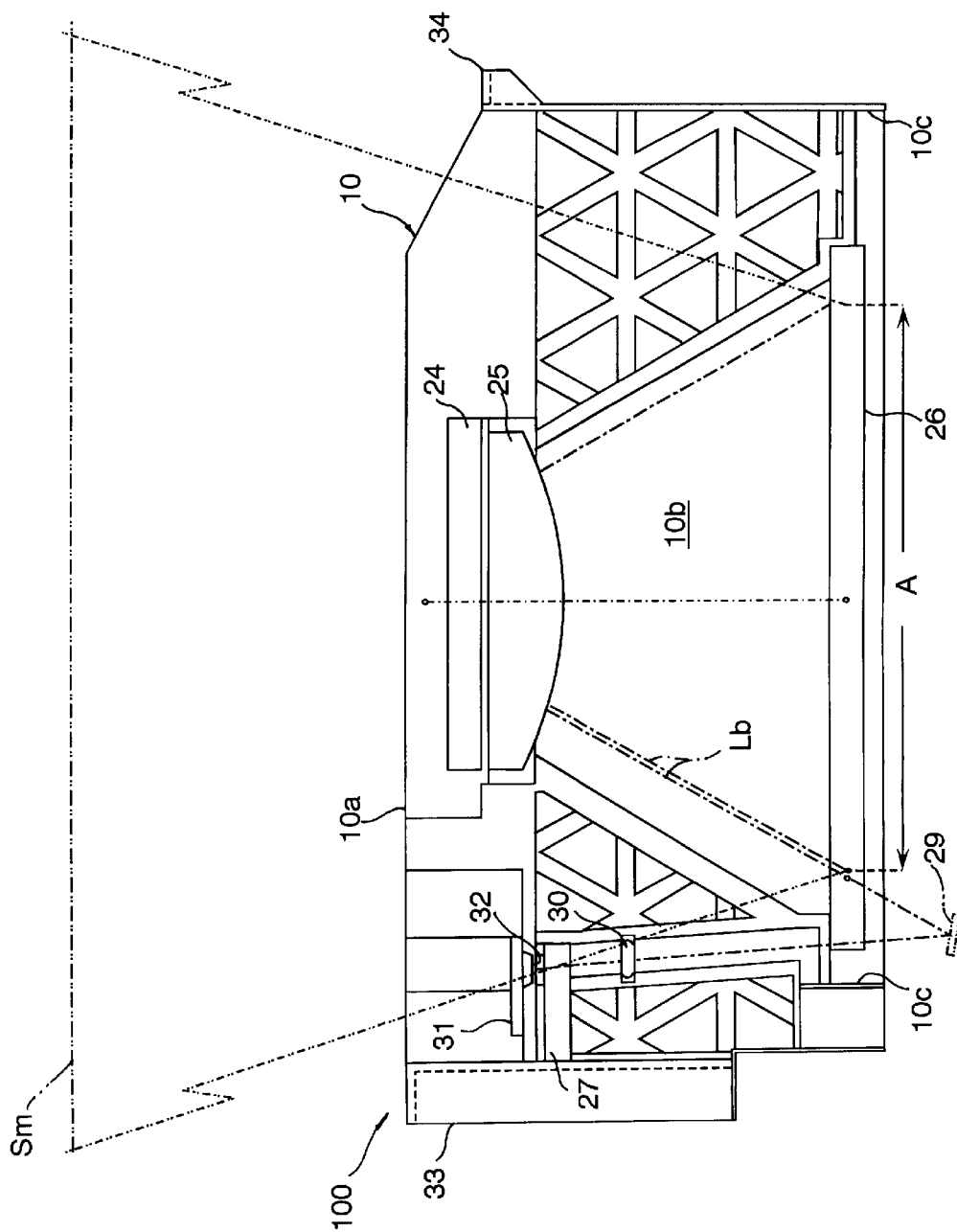
FIG. 2 is a front view of the optical scanning device.
Figure 3:
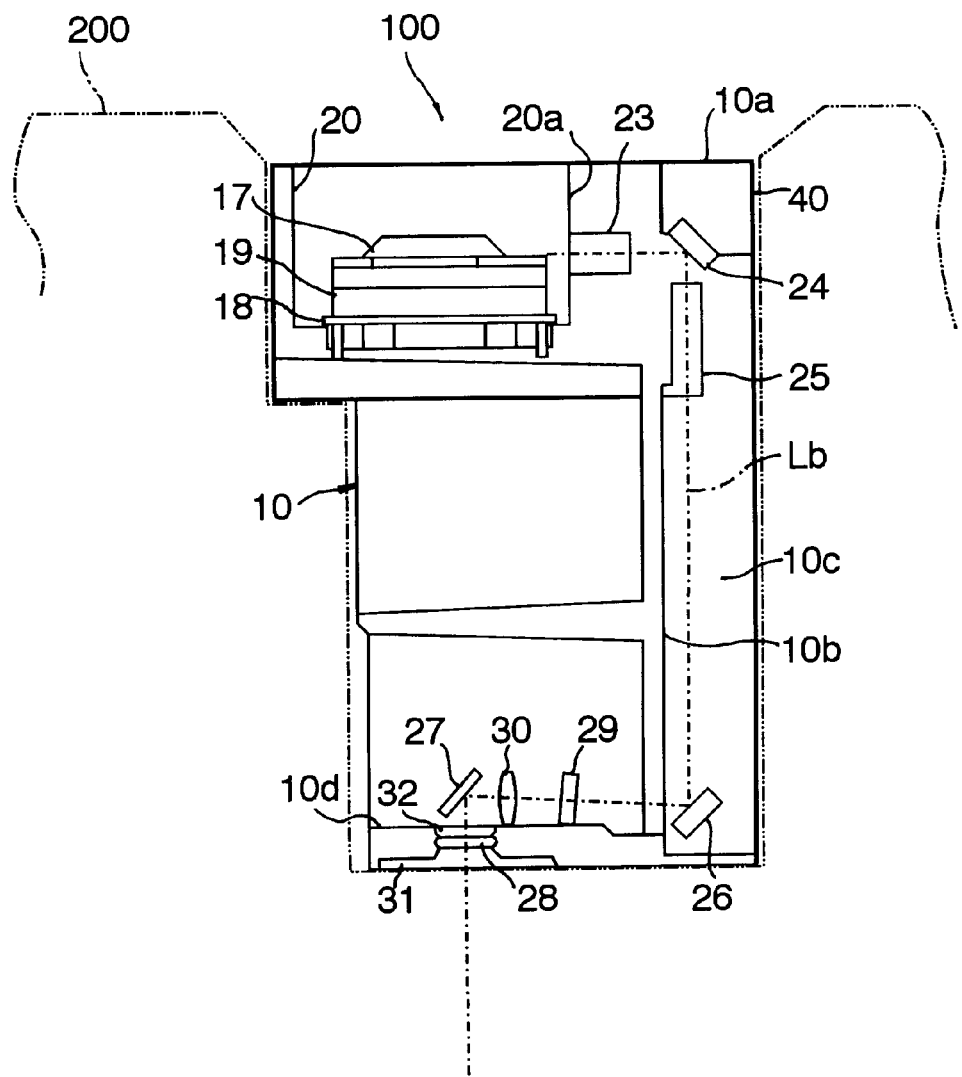
FIG. 3 is a cross-sectional view of FIG. 1 taken along a line III—III.

Referring to the drawings in detail, and in particular to FIGS. 1 to 3 showing an optical scanning device 100 equipped with an f-θ lens system in accordance with a preferred embodiment of the present invention, the optical scanning device 100, which is typically is detachably fitted to an instrument such as a printer schematically shown at 200 in FIG. 3, has a generally rectangular parallelepiped box-shaped housing (which is hereafter referred to as a box housing for simplicity) 10. The box housing 10 is provided with a detachable cover 40 which has a generally inverse L-shaped configuration so as to cover the top of the box housing 10 and a rear space defined by the rear wall 10b and extension of opposite side walls 10c. The box housing 10 at opposite sides is provided with handles 33 and 34 integrally formed therewith for easy handling. Because the optical scanning device 100 has to provide a space sufficiently large for movement of scanning beam between the optical scanning device 100 and an instrument 200 to which the optical scanning device 100 is installed, the box housing 10 is preferably shaped to have a large width in a scanning direction and a small depth in a direction in which the optical scanning device 100 is installed to the related instrument 200. The optical scanning device 100 has a scanning optical system which comprises a polygon mirror 17, a light beam projection optical system arranged on one side of the polygon mirror 17 close to the laser diode 12, an f-θ lens system arranged on another side of the polygon mirror 17 which is at an angle of approximately right angle with respect to the side facing to the light beam projection optical system, and a scanning timing control optical system. The optical scanning device 100 further has a light source such as laser diode 12 that is mounted a base board 11 of the box housing 10 so as to project a laser beam Lb along an optical path Xa extending zigzag in a horizontal plane.

The light beam projection optical system comprises collimator lens 13, a cylindrical lens 14 and a pair of reflection mirrors 15 and 16 stationarily arranged in order from the laser diode 12 so as to direct the light beam Lb to the polygon mirror 17. The f-θ lens system comprises a first lens element 23, a first reflection mirror 24, a second lens element 25 and a second reflection mirror 26. The polygon mirror 17 is directly and firmly secured to a rotary shaft (not shown) of an electric motor 19 that is mounted on a base board 18 bolted, or otherwise secured, to the box housing 10 and continuously rotated by the electric motor 19 in a counter-clockwise direction as shown by an arrow in FIG. 1. As is well known in the art, the polygon mirror 17 reflects the laser beam Lb incident thereupon and deflects it toward the f-( lens element system. The box housing 10 is formed with a dust proof chamber 20 for receiving a polygon mirror unit 150 including the polygon mirror 17 and the electric motor 19 pre-assembled together to the base board 18 therein, so as thereby to keep the polygon mirror 17 from dust. On the top of the base board 18 there are arranged a number of electronic parts forming a control circuit (not shown). Because of installation of the motor and the electronic parts in the interior of the dust proof chamber 20, the dust proof chamber 20 is heated to a somewhat high temperature. On account of a rise in temperature of the dust proof chamber 20, the box housing 10 is integrally formed with, or otherwise provided with, a cooling fin arrangement having a plurality of internal cooling fins 21 arranged in the inside thereof and a heat pipe 22 through which the inside of the dust proof chamber 20 is thermally connected to the cooling fin arrangement, so as to cool the inside of the dust proof chamber 20. According to the construction of the dust proof chamber 20, although the electric motor 19 and the electronic parts are sealed within the dust proof chamber 20, the polygon mirror 17 is not only kept from dust but prevented from a rise in temperature with which reflective surfaces of the polygon mirror 17 usually cause distortion. The scanning optical system has an the f-θ lens system comprising two lens elements, i.e. the first lens element 23 and the second lens element 25, the first and second reflection mirrors 24 and 26. The first reflection mirror 24 is disposed in the optical axis between the first and second lens elements 23 and 25, and the second reflection mirror 26 is disposed in the optical axis after the second lens element 25. Specifically, as seen in FIG. 3, the first lens element 23 is directly fitted and secured in an opening 20b (see FIG. 1) formed in a vertical side wall 20a of the dust proof chamber 20 and the second lens element 25 is secured to a rear vertical wall 10b of the box housing 10. The first reflection mirror 24 is disposed at an upper corner of the box housing 10 between the top of the box housing 10 where the first lens element 23 is disposed and the side of the box housing at which the second lens element 25 is and positioned right above the second lens element 25 so as to turn downward the optical axis at a right angle. The second reflection mirror 26 is disposed at a bottom corner of the box housing 10 between the bottom of the box housing 10 and the rear vertical wall 10b of the box housing 10 to which the second lens element 25 is secured so as to turn back the optical axis at a right angle. The laser beam Lb reflected and deflected by the polygon mirror 17 passes first through the first lens element 23 forming another part of the f-θ lens system and then reflected and directed downward at a right angle by the first reflection mirror 24. The laser beam Lb directed downward further passes the second lens element 25 forming another part of the f-θ lens system and travels along the rear vertical wall 10b of the box housing 10 until reaching the second reflection mirror 26. Thereafter, the laser beam 12 is reflected and directed backward to the scanning timing control optical system for synchronization of scanning.

As shown in FIGS. 2 and 3, the scanning timing control optical system comprises a reflection mirrors 27 and 29 disposed behind the second reflection mirror 26, and a relay lens element 30 disposed between the reflection mirrors 27 and 29. The scanning timing control optical system is accompanied by an optical sensor 32 such as a photoelectric element sensor covered by a protective transparent glass 28. The reflection mirror 29 is located on a bottom wall 10d of the box casing 10, and the reflection mirror 27 is located on the bottom wall 10d of the box casing 10 as shown in FIG. 3 but slightly off set sideways from the reflection mirror 29 as shown in FIG. 2. Although the reflection mirror 29 is depicted on a straight path of the laser beam for an easy understanding in FIG. 2, it is actually located behind the second reflection mirror 26 as shown in FIG. 3. The reflection mirror 29 is small in size and located in the box housing 10 so as to receive and reflect back the laser beam Lb that is reflected forward by the second reflection mirror 26 at the very moment that the polygon mirror 17 turns and changes its active reflection surface on which the laser beam Lb directed by the laser beam projection optical system impinges from one to another, in other words, to receive only the laser beam Lb reflected by an extreme end of a given effective range of the reflection mirror 26 that is allowed for line scanning. The laser beam Lb reflected by the extreme end of the second reflection mirror 26 (which is hereafter referred to a synchronous laser beam) is reflected by the reflection mirror 29 and directed back to the second reflection mirror 26. Then the synchronous laser beam Lb is reflected again by the second reflection mirror 26 and directed to the reflection mirror 27 through the relay lens element 30 and further reflected downward by the reflection mirror 27 and directed to the optical sensor 32. The optical sensor 32 covered by the protective glass 28 is secured to a base board 31.

In response to reception of the laser beam Lb, the optical sensor 32 provides a control circuit of a printer that is equipped with the optical scanning device 100 with a synchronous signal for a start or an end of each line scanning of a scanning subject medium Sm.

In operation of the optical scanning device 100 thus constructed, when powering on the optical scanning device 100, directly or indirectly, and exciting the laser diode 12 to generate a laser beam Lb, the optical scanning device 100 is made ready to operate. When the electric motor 19 is actuate, the polygon mirror 17 rotates to continuously and repeatedly reflects the laser beam Lb so as to direct the laser beam Lb to the scanning optical system. The laser beam Lb reflected by the polygon mirror 17 travels through of the scanning optical system having a optical path Xb that is turned. Specifically the laser beam Lb travels passing through the first lens element 23 of the f-θ lens system that is directly secured to the dust proof chamber 20 and is subsequently reflected downward by the first reflection mirror 24 located at the rear top corner and travels along the rear vertical wall 10b of the box housing 10. The laser beam Lb reaches the second reflection mirror 26 located at the rear bottom corner of the box housing 10 and is reflected forward toward the back of the box housing 10. At the very moment that the polygon mirror 17 changes it active reflection surface from one to another, the laser beam Lb is directed to the scanning timing control optical system that is located at the bottom 10c of the box housing 10 behind the second reflection mirror 26 for generating a synchronous signal. Immediately thereafter, the laser beam Lb is directed toward a scanning subject medium Sm placed behind the optical scanning device 100 for synchronized line scanning. While the polygon mirror 17 turns through a regular rotational angle θ, the laser beam Lb moves over the given line scanning range A. At every moment that the polygon mirror 17 changes its active reflection surface from one to another, the optical sensor 32 receives a synchronous laser beam Lb and provides a synchronous signal. While the polygon mirror 17 turns through the regular rotational angle θ, the laser beam Lb moves from one extreme end to the another extreme end of the given line scanning range A for line scanning of the scanning subject medium Sm. With continuous rotation of the polygon mirror 17, the laser beam Lb repeats line movement over the given line scanning range.

It is to be noted that the f-θ lens system can comprise three or more lens elements with the same effect as comprising two lens elements. In this case the first reflection mirror is disposed between any adjacent two lens elements.

As apparent from the above description relating to the optical scanning device in accordance with a preferred embodiment, installation one of the f-θ lens system forming part of the scanning optical system, namely the first lens element 23, directly to one wall of the dust proof chamber 20 for the polygon mirror 17 and the electric motor 19 avoids the necessity of a transparent glass operative to prevent dust from entering the interior of the chamber 20 through the opening 20b with an effect of reducing the number of parts and reducing the depth of box housing 10, which is contributory to making the optical scanning device 10 compact in size and reducing costs. The f-θ lens system that has a relatively long optical path length is constructed by arranging separately the two lens elements, one at the rear top corner of the box housing 10 and another at the rear bottom corner of the box housing 10, so as to lay the optical path along the side vertical wall 10c of the box housing 10, as a result of which the optical scanning device 100 is configured significantly compact in overall size. Further, the scanning timing control optical system is laid out to include the second reflection mirror 26 as a part thereof so as to reflect a synchronous laser beam Lb twice by the second reflection mirror 26. This optical structure provides an effect of reducing the number of parts and reducing the depth of box housing 10, which is also contributory to making the optical scanning device 10 compact in size and reducing costs.

What is claimed is:

1. An optical scanning device for scanning a subject with a light beam spot that moves along a straight line on the subject medium, said optical scanning device comprising:
    a generally rectangular box-shaped housing; and
    a scanning optical system installed in said generally rectangular box-shaped housing, said scanning optical system including at least a rotary polygon mirror for repeatedly reflecting and deflecting a scanning beam incident thereupon and an f-θ lens system for continuously varying movement of the scanning beam spot relative to a regular angle of rotation of the polygon mirror so as to scan over the subject medium at an even scanning speed;
    wherein said f-θ lens system comprises at least first and second lens elements and at least one reflection mirror located between said first and second lens elements so as to form an optical path which is turned at approximately right angle by said reflection mirror and extends along at least two adjacent walls of said generally rectangular box-shaped housing.

2. An optical scanning device as defined in claim 1, wherein said rotary polygon mirror is located near a top wall of said generally rectangular box-shaped housing and has a vertical axis of rotation so as to reflect said scanning beam in a horizontal plane and said f-θ lens system forms said optical path extending along said top wall and one of vertical side walls.

3. An optical scanning device as defined in claim 2, wherein said generally rectangular box-shaped housing has a chamber therein for receiving said polygon mirror, said chamber being closed by a top wall of said generally rectangular box-shaped housing and said first lens fitted in said opening so as to keep the interior of said chamber from dust.

4. An optical scanning device as defined in claim 3, wherein said top wall is comprised of a removable top cover.

5. An optical scanning device as defined in claim 3, and further comprising a cooling fin arrangement having a plurality of cooling fins disposed in said generally rectangular box-shaped housing and a heat pipe for interconnecting the inside of said chamber and said cooling fin arrangement.

6. An optical scanning device as defined in claim 2, wherein said second lens is secured to said one vertical side wall.

7. An optical scanning device as defined in claim 6, wherein said reflection mirror is located at a top corner between said top wall and said one vertical side wall.

8. An optical scanning device as defined in claim 1, wherein said f-θ lens system further comprises another reflection mirror located below said second lens element for reflecting said scanning beam toward another one of said vertical side walls opposite to said one vertical side wall.

9. An optical scanning device as defined in claim 8, and further comprising a scanning timing control optical system disposed behind said another reflection mirror of said f-θ lens system for detecting one of a start and an end of movement of the scanning beam spot along said straight line on the subject medium to provide a signal for synchronized scanning.

10. An optical scanning device as defined in claim 9, wherein said scanning timing control optical system comprising a reflection mirror located behind said another reflection mirror so as to reflect a scanning beam reflected by said another reflection mirror back to said another reflection mirror at every moment that said polygon mirror turns and changes its active reflection surface on which said laser beam impinges from one to another, and a light sensor located in position so as to receive said scanning beam reflected by said reflection mirror of said scanning timing control optical system and subsequently by said another reflection mirror to provide said signal.

* * * * *